United States Patent [19]
Hawkes et al.

[11] 3,852,055
[45] Dec. 3, 1974

[54] NONCAKING FERTILIZERS
[75] Inventors: George R. Hawkes, Concord; Clive Hodgson, Forest Knolls; Marion G. Reed, Hacienda Heights; William G. Toland, San Rafael, all of Calif.
[73] Assignee: Chevron Research Company, San Francisco, Calif.
[22] Filed: Jan. 15, 1973
[21] Appl. No.: 323,571

[52] U.S. Cl............................ 71/59, 71/60, 71/64 E
[51] Int. Cl............................................... C05c 1/02
[58] Field of Search............. 71/1, 59, 60, 63, 64 E; 423/266, 267, 275, 396; 149/7, 46

[56] References Cited
UNITED STATES PATENTS
2,739,036   3/1956   Kamenjar et al. .................. 423/267
3,027,250   3/1962   Michelitsch et al................. 71/64 E
3,116,108   12/1963  Brouwers et al. .................. 71/64 E
3,640,697   2/1972   Toops................................ 71/64 E Primary Examiner—Charles N. Hart
Attorney, Agent, or Firm—G. F. Magdeburger; John Stoner, Jr.; Raymond Owyang

[57] ABSTRACT

The caking tendency of fertilizers and other hygroscopic salts during storage is reduced by uniformly incorporating therein a minor amount of a hydroxyaluminum polymer.

18 Claims, No Drawings

NONCAKING FERTILIZERS

BACKGROUND OF THE INVENTION

1. Field of the Invention

This invention relates to non-caking fertilizers and explosives. It is known that granular, powdery or crystallized fertilizer compositions, particularly ammonium nitrate compositions, tend to cake while stored either in bulk or packages. Fertilizer compositions which cake are not amenable to usual bulk storing and handling techniques and after storage cannot be applied easily in the field with mechanical distribution devices.

2. Description of the Prior Art

U. K. Patent No. 1,119,702, published July 10, 1968, discloses that the caking tendency of granular nitrate-containing fertilizers can be reduced by incorporating into the fertilizer a small amount of aluminum hydroxide or a basic aluminum salt. Noncaking, non-hygroscopic ammonium nitrate-containing finely-dispersed aluminum salts of higher fatty acids is disclosed in Czech. application No. 98,596, published Nov. 23, 1959 [*Chem. Abs.*, 56, 8296d (1962)], U. K. Patent No. 891,562, published Mar. 14, 1962, and Belgian application No. 587,791, published Aug. 18, 1960, disclose non-caking ammonium nitrate containing aluminum sulfate.

SUMMARY OF THE INVENTION

It has now been found that solid, non-caking particulate fertilizer compositions are produced by incorporating therewith about 0.01 to 5% by weight of a hydroxy-aluminum polymer. The invention is particularly useful for producing non-caking ammonium nitrate-containing fertilizers.

DESCRIPTION OF THE INVENTION

The Hydroxy-Aluminum Polymers

The hydroxy-aluminum polymers employed for preparing the non-caking compositions of the invention are known. These polymers can be prepared by the controlled addition of an alkali metal base, e.g., sodium hydroxide, to an aqueous solution of a water-soluble aluminum salt. It is believed that when the base is added to an aluminum salt solution, OH— ions link the $Al^{3+}$ ions together forming stable rings composed of six Al atoms per unit. When the molar ratio of OH/Al is in the range of 0 to 2.1, the reaction involves the formation of single units of compositions $[Al_6(OH)_{12}]^{6+}$ or double units $[Al_{10}(OH)_{22}]^{8+}$. With ratios from 2.25 to 2.7, the additional OH— reacts with these simple units and forms a continuous series of higher polymers.

In general, any aluminum salt having a solubility of about 25% by weight in hot water (70°–100°C.) is suitably employed for the preparation of the hydroxy-aluminum polymers. Suitable inorganic aluminum salts include aluminum chloride, aluminum bromide, aluminum iodide, aluminum nitrate and aluminum sulfate. Suitable organic aluminum salts include salts of carboxylic acids such as aluminum lactate and aluminum alkanoates of 2 to 5 carbon atoms, e.g., aluminum acetate and aluminum propionate.

In order to reduce the tendency of fertilizer compositions to cake, the hydroxy-aluminum polymer should have a hydroxy to aluminum molar ratio of from about 1 to 2.9, preferably about 1.7 to 2.7, and most preferably from about 2.0 to 2.5.

Provided the hydroxy-aluminum polymer has the hydroxy/aluminum molar ratios defined above, the reduction in caking tendency of fertilizer compositions produced by the hydroxy-aluminum polymers is independent of the nature of the anion portion of the aluminum salt employed to prepare the hydroxy-aluminum polymer. However, due largely to their plant nutrient value, nitrate and sulfate anions are preferred.

The nature of hydroxy-aluminum polymers and their preparation are discussed by P. H. Hsu and T. F. Bates, in *Soil Science Society of America Proceedings*, 28, No. 6, 763–769 (1964), and in "Formation of X-ray Amorphous and Crystalline Aluminum Hydroxides," *Mineralogical Magazine*, 33, 749–768 (1964).

Fertilizer Composition

The term "fertilizer composition," as used herein, refers to hygroscopic inorganic fertilizer compounds, mixtures of these compounds or compositions containing one or more of these compounds. Inorganic fertilizer compounds include salts, such as ammonium nitrate (including explosive grade), ammonium sulfate, ammonium phosphate, monoammonium phosphate, diammonium phosphate and ammonium chloride, potassium chloride, potassium oxide, etc. The hydroxy aluminum polymers are preferred for use with nitrogen-containing fertilizers, e.g., ammonium salt fertilizers, especially ammonium nitrate-containing fertilizers. Examples of such ammonium nitrate-containing fertilizers include ammonium nitrate sulfate, 30-0-0, containing 70% ammonium nitrate and 30% ammonium sulfate; 16-16-16, containing 38% ammonium nitrate, 25% potassium chloride, and 14% ammonium phosphates; 27-12-0, containing 52% ammonium nitrate and 21% ammonium phosphates; 22-22-0 containing 53% ammonium nitrate and 20% ammonium phosphates; 10-20-20, containing 21% ammonium nitrate, 32% potassium chloride and 14% ammonium phosphates; 13-34-10, containing 18% ammonium nitrate, 44% ammonium phosphates and 16% potassium chloride; 20-10-10, containing 57% ammonium nitrate and 16% potassium chloride; and 15-5-25, containing 40% ammonium nitrate, 6% ammonium phosphates and 48% potassium sulfate.

Although the hydroxy-aluminum polymers are useful for inhibiting the caking of fertilizer in powdered form, they are particularly useful for fertilizers in particulate form, e.g., granules or prills. Particulate fertilizers will generally be macroparticles of at least 20 Tyler mesh or greater.

The caking tendency of hygroscopic fertilizers increases with increasing water content of the fertilizer compounds or composition. The hydroxy-aluminum polymers are effective for inhibiting the caking of fertilizers having 1% or more by weight, based on total weight of composition, of water, and are particularly effective for inhibiting the caking of fertilizers having 0.5% to 1%, calculated on the same basis, of water.

The exact amount of hydroxy-aluminum polymer employed with the hygroscopic compound or composition will vary, depending upon the particular compound, the use to which the compound or composition will be made, the conditions under which it will be stored, the amount of cake resistance desired, and the presence of other materials. Generally, however, the amount of hydroxy-aluminum polymer (solid basis) employed is in the range of 0.01% to 5% by weight, based on the weight of the total composition, although best results are obtained with amounts in the range of from about 0.1 to 2%, more preferably, from about 0.1 to 1% by weight, calculated on the same basis.

The hydroxy-aluminum polymer must be intimately admixed with the fertilizer composition and evenly distributed throughout the fertilizer particles. Generally, the hydroxy-aluminum polymer is incorporated or admixed with the fertilizer while in aqueous form and prior to prilling or granulation, and preferably at a pH in the range of about 4 to 5.

The resistance to caking of the hydroxy-aluminum polymer-containing fertilizer compositions of the invention can be further improved by dusting or coating the fertilizer compositions with a powdered moisture absorptive material so as to form a more or less continuous tenacious barrier of absorbent around each of the fertilizer granules. Absorptive materials which are suitably employed include coconut shell meal, ground rice hulls, ground tobacco stems, resins, soaps, waxes, glycerine, kaolin, clay, diatomaceous earth, talc, magnesium silicate, magnesium sulfate, and the like. The amount of adsorptive material used to coat the fertilizer granules ranges from about 1 to 5% by weight, based on the total composition. Generally, however, the hydroxy-aluminum polymer is sufficient to improve the caking resistance of the fertilizer composition and the additional dusting or coating with an absorptive material is not necessary.

The improved resistance to caking and increased strength of fertilizers containing the hydroxy-aluminum polymers are determined by the following tests:

Caking Test

The caking tendency was measured by the method of J. F. Wilson, J. C. Hillyer, V. C. Vives, and R. E. Rensser, *Agricultural Chemicals*, page 42, September 1962. The heating-cooling cycle was modified to have an upper limit of 175°F and a lower limit of 65°F.

Hardness Test

Hardness was measured directly by the force required in pounds to disintegrate single prills having a size of −8 +9 Tyler mesh. The hardness tester was a Chatillon Model DPP–10. An average breaking strength of 25 prills was taken as the measure of prill hardness.

The preparation of the fertilizer compositions and the results of caking and hardness tests therewith are described in the following Examples and Tables.

EXAMPLE 1

Preparation of ANS 30-0-0 Containing No Additive.

Ammonium nitrate (729 g.), ammonium sulfate (315 g.) and water (1,350 g.) were slurried together at 60° to 70°C. until complete dissolution had taken place. The pH of the solution was then adjusted to between 4.5 and 5.0 using 1:1 aqua ammonia. Next, the solution was sprayed at a rate of from 3 to 6 ml/min. through a pneumatic nozzle and onto a bed of ammonium nitrate fines (−20 +24 Tyler mesh) in a laboratory fluid bed granulator. The air temperature in the granulator was controlled in the range 95°C. to 100°C. Granule buildup continued until essentially all were in the size range −8 +12 Tyler mesh and the total weight was between 450 and 600 g. The sample was subsequently cooled and coated with a 2% by weight mixture of diatomaceous earth (Celatom, 3 parts) and talc (1 part). It was then analyzed for water content, granule hardness and caking tendency. The sample prepared and tested in this way is shown as Sample 1 in Table 1.

EXAMPLE 2

Preparation of ANS 30-0-0 Containing 3% $Al_2(SO_4)_3$.

Ammonium nitrate (672 g.), ammonium sulfate (314 g.), $Al_2(SO_4)_3 \cdot 18H_2O$ (62 g.) and water (1,350 g.) were slurried together at 60 to 70°C. until complete dissolution had taken place. The pH was then adjusted using 1:1 aqua ammonia to between 4.5 and 5.0, resulting in a finely-dispersed precipitate. The slurry was subsequently sprayed as in Example 1 until 450 to 600 g. of product was obtained.

The sample, after cooling, was divided into two portions. One part was coated and tested as in Example 1. The other part was allowed to absorb moisture in an 81% relative humidity chamber for 16 hours at 20°C. Then, after a 3 day waiting period, it too was coated and tested in the same manner. The samples prepared in this way are shown as Sample 2a and 2b in Table 1.

EXAMPLE 3

Preparation of ANS 30-0-0 Containing 0.5% Hydroxy-Aluminum Chloride.

Ammonium nitrate (729 g.), ammonium sulfate (315 g.) and water (1,350 g.) were slurried together at 60° to 70°C. until complete dissolution had taken place. The pH was adjusted to 4.2 using 1:1 aqua ammonia and 10.5 g. of a 50% solution of hydroxy-aluminum chloride was added. A slight turbidity was produced by this addition of the hydroxy-aluminum chloride which had a hydroxyl to aluminum ratio of 2.54:1. Granulation took place as in Examples 1 and 2 and the product, after cooling, was divided into two portions and processed as in Example 2. The two portions prepared in this way are shown as Samples 3a and 3b in Table 1.

EXAMPLE 4

Preparation of ANS 30-0-0 Containing 0.25% Hydroxy-Aluminum Chloride.

The method of preparation was identical to that of Example 3 with the exception that only 5.25 g. of hydroxy-aluminum chloride solution was used. The two samples resulting from this preparation are shown as Samples 4a and 4b in Table 1.

EXAMPLE 5

Preparation of ANS 30-0-0 Containing 0.1% Hydroxy-Aluminum Chloride.

The method of preparation was identical to those of Examples 3 and 4 with the exception that only 2.1 g. of hydroxy-aluminum chloride solution was used. The two samples resulting from this preparation are shown as Samples 5a and 5b in Table 1.

EXAMPLE 6

Preparation of ANS 30-0-0 Containing 0.05% Hydroxy-Aluminum Chloride.

The method of preparation was identical to that of Examples 3, 4 and 5 with the exception that only 1.05 g. of hydroxy-aluminum chloride was used. The two samples resulting from this preparation are shown as Samples 6a and 6b in Table 1.

EXAMPLE 7

Preparation of ANS 20-0-0 Containing 0.5% Hydroxy-Aluminum Chloride.

The method of preparation was the same as in Example 3 with the exception that all of the granulated product was allowed to absorb moisture at 81% R.H., and the testing of the product was done without the application of any coating agent. The sample resulting from this preparation is shown as Sample 7 in Table 1.

EXAMPLE 8

Preparation of Ammonium Nitrate With No Additive.

Ammonium nitrate (1,050 g.) was dissolved in water (1,350 g.) at 60° to 70°C. and the solution granulated as in Examples 1 through 7. The granulated product was split into two portions, one part being allowed to absorb moisture as in Example 2, and then both portions coated with 2% Celatom/Talc before being tested. The samples resulting from this preparation are shown in Table 2 as Samples 8a and 8b.

EXAMPLE 9

Preparation of Ammonium Nitrate Containing 0.5% Hydroxy-Aluminum Chloride.

Ammonium nitrate (1,050 g.) was dissolved in water (1,350 g.) at 60° to 70°C. After adjusting to a pH of 4.2, hydroxy-aluminum chloride solution (10.5 g.) was added and the slightly turbid solution sprayed into the fluid bed granulator. The granulated product was divided into two portions as before, one part being allowed to absorb moisture, and then both portions coated with 2% Celatom/Talc before being tested. The samples resulting from this preparation are shown in Table 2 as Samples 9a and 9b.

EXAMPLE 10

Preparation of Hydroxy-Aluminum Nitrate Solutions.

a. From Aluminum Metal and Aluminum Nitrate Nonahydrate

Aluminum nitrate nonahydrate (75 g.), water (100 g.) and aluminum metal powder (6.17 g.) were boiled under reflux until all the aluminum had dissolved. Urea (6.17 g.) was also added to reduce nitrogen oxide emission. Analysis of the resulting solution showed it to contain 6.60% aluminum and a OH/Al ratio of 2.27:1.

b. From Aluminum Hydroxide Dried Gel and Aluminum Nitrate Nonahydrate

Aluminum nitrate nonahydrate (75 g.), water (100 g.) and aluminum hydroxide dried gel (40 g.) were boiled under reflux until the solution was almost clear. Analysis of the clear supernatant solution showed it to contain 7.20% aluminum and a OH/Al ratio of 1.99:1.

Preparation of hydroxy-aluminum salts in situ, during the fertilizer manufacturing process, is an alternative and advantageous way of introducing basic aluminum compounds into fertilizers.

For example, using method of preparation (b) above, aluminum hydroxide gel could be added to the front end of a reactor chain containing a solution of ammonium nitrate and aluminum nitrate. Dissolution of the aluminum hydroxide would proceed in the reactors after which the pH could be trimmed by ammoniation and granulation of the ammonium nitrate effected by any of the usual methods.

TABLE 1

PHYSICAL PROPERTIES OF ANS 30-0-0 CONTAINING HYDROXY-ALUMINUM CHLORIDE AND ALUMINUM SULFATE

| SAMPLE NO. | ADDITIVE LEVEL, WT % SOLIDS BASIS | COATING AGENT | % H$_2$O | CAKING BREAKING STRENGTH | HARDNESS |
|---|---|---|---|---|---|
| 1 | 0% No Additive | 2% Celatom/Talc | 0.10 | 277 psi | 4.4 lbs |
| 2a | 3% Hydrated Aluminum Sulfate | 2% Celatom/Talc | 0.46 | 7 | 6.0 |
| 2b * | 3% Hydrated Aluminum Sulfate | 2% Celatom/Talc | 0.84 | 265 | 3.8 |
| 3a | 0.5% Hydroxy Aluminum Chloride | 2% Celatom/Talc | 0.21 | 9 | 6.1 |
| 3b * | 0.5% Hydroxy Aluminum Chloride | 2% Celatom/Talc | 0.71 | 33 | 3.5 |
| 4a | 0.25% Hydroxy Aluminum Chloride | 2% Celatom/Talc | 0.24 | 56 | 5.3 |
| 4b * | 0.25% Hydroxy Aluminum Chloride | 2% Celatom/Talc | 0.82 | 91 | 2.4 |
| 5a | 0.1% Hydroxy Aluminum Chloride | 2% Celatom/Talc | 0.13 | 108 | 6.1 |
| 5b * | 0.1% Hydroxy Aluminum Chloride | 2% Celatom/Talc | 0.33 | 203 | 2.9 |
| 6a | 0.05% Hydroxy Aluminum Chloride | 2% Celatom/Talc | 0.17 | 204 | 5.0 |
| 6b * | 0.05% Hydroxy Aluminum Chloride | 2% Celatom/Talc | 0.28 | 231 | 2.3 |
| 7 * | 0.5% Hydroxy Aluminum Chloride | None, Uncoated | 0.53 | 126 | 4.7 |

* Sample allowed to absorb moisture for 16 hours in 81% relative humidity at 20°C.

TABLE 2

EFFECT OF HYDROXY-ALUMINUM CHLORIDE ON THE PHYSICAL PROPERTIES OF AMMONIUM NITRATE

| SAMPLE NO. | ADDITIVE LEVEL, WT % SOLIDS BASIS | COATING AGENT | % H$_2$O | CAKING BREAKING STRENGTH | HARDNESS |
|---|---|---|---|---|---|
| 8a | 0% No Additive | 2% Celatom/Talc | 0.11 | 100 psi | 1.9 lbs. |
| 8b * | 0% No Additive | 2% Celatom/Talc | 0.28 | 179 | 0.8 |
| 9 | 0.5% Hydroxy Aluminum Chloride | 2% Celatom/Talc | 0.18 | 80 | 2.3 |
| 9b * | 0.5% Hydroxy Aluminum Chloride | 2% Celatom/Talc | 0.43 | 146 | 1.7 |

* Sample allowed to absorb moisture for 16 hours in 81% relative humidity at 20°C.

EXAMPLES 11-16

Preparation of ANS 30-0-0 Containing 0.125% Aluminum as Hydroxy-Aluminum Nitrate.

ANS 30-0-0 samples containing 0.125% by weight aluminum as hydroxy-aluminum nitrate polymer, having various hydroxy to aluminum mol ratios, were prepared. The samples were prepared as follows: Ammonium nitrate (729 g.), ammonium sulfate (315 g.) and water (1300 g.) were heated to form a solution. Then, hydroxy-aluminum nitrate solutions, having a varying hydroxyl to aluminum mol ratio and prepared by the general method described in Example 10a, were added in sufficient quantity to give an aluminum content of 0.125% in each ANS sample. The solution were subsequently sprayed on to a bed of ammonium nitrate fines (−20 +24 mesh) in a fluid bed granulator until all the granules had grown to a size of −8 +12 Tyler mesh. A portion of the granules was next exposed for 16 hours in a 81% relative humidity chamber to increase its moisture content. The samples were subsequently coated with a 2% by weight mixture of diatomaceous earth (3 parts, Celatom) and talc (1 part). The samples were then analyzed for water content, granule hardness

TABLE 3

EFFECT OF HYDROXY TO ALUMINUM RATIO ON THE PHYSICAL PROPERTIES OF ANS 30-0-0 CONTAINING HYDROXY-ALUMINUM NITRATE

| SAMPLE NO. | ADDITIVE LEVEL, WT % TOTAL SOLIDS | COATING AGENT | % $H_2O$ | CAKING TENDENCY | HARDNESS |
| --- | --- | --- | --- | --- | --- |
| 11 | 0.125% Al as $Al(OH)_{2.27}(NO_3)_{0.73}$ | None, Uncoated | 0.49 | 126 psi | 2.3 lbs. |
| 12a | 0.125% Al as $Al(OH)_{2.3}(NO_3)_{0.7}$ | 2% Celatom/Talc | 0.29 | 4 | 7.3 |
| 12b * | do. | 2% Celatom/Talc | 0.63 | 45 | 3.1 |
| 13a | 0.125% Al as $Al(OH)_{1.85}(NO_3)_{1.15}$ | 2% Celatom/Talc | 0.37 | 3 | 6.6 |
| 13b * | do. | 2% Celatom/Talc | 0.82 | 60 | 2.6 |
| 14a | 0.125% Al as $Al(OH)_{1.66}(NO_3)_{1.34}$ | 2% Celatom/Talc | 0.36 | 6 | 6.6 |
| 14b * | do. | 2% Celatom/Talc | 0.74 | 220 | 3.2 |
| 15a | 0.125% Al as $Al(OH)_{1.3}(NO_3)_{1.7}$ | 2% Celatom/Talc | 0.24 | 9 | 6.8 |
| 15b * | do. | 2% Celatom/Talc | 0.39 | 263 | 3.6 |
| 16a | 0.125% Al as $Al(OH)_{1.1}(NO_3)_{1.9}$ | 2% Celatom/Talc | 0.29 | 84 | 6.8 |
| 16b * | do. | 2% Celatom/Talc | 0.49 | 309 | 4.4 |

* Exposed for 16 hours at 81% relative humidity.

and caking tendency. The samples were prepared and tested and the results are tabulated in Table 3.

EXAMPLE 17

Preparation of ANS 30-0-0 Containing Hydroxy-Aluminum Acetate.

Ammonium nitrate (729 g.), ammonium sulfate (315 g.) and water (1300 g.) were heated to form a solution. The pH was adjusted to a value of 4.7 using nitric acid and ammonia and then 23.0 g. of a 30% solution of basic aluminum acetate $Al(OH)_2(OOCCH_3) \cdot 1/3H_3BO_3$ was added. The solution was subsequently sprayed onto a bed of ammonium nitrate fines (−20 °24 mesh) in a fluid bed granulator until all the granules had grown to a size of −8 +12 Tyler mesh.

The sample was then split into two portions. One portion was coated with a 2% by weight mixture of diatomaceous earth (3 parts) and talc (1 part). The other portion was exposed for 16 hours in a 81% relative humidity chamber before being coated with 2% of the Celatom/talc. Both portions were then tested, the results of which are as follows:

| SAMPLE NO. | ADDITIVE LEVEL | % $H_2O$ | CAKING | HARDNESS |
| --- | --- | --- | --- | --- |
| 17a | 0.125% Al as Hydroxy-Aluminum Acetate | 0.25 | 47 psi | 7.1 lbs. |
| 17b | 0.125% Al as Hydroxy-Aluminum Acetate | 0.52 | 213 psi | 2.7 lbs. |

We claim:

1. A particulate ammonium salt composition having intimately admixed therewith from about 0.01 to 5% by weight, based on weight total composition, of a hydroxy-aluminum polymer having a hydroxyl to aluminum mol ratio of about 1 to 2.9.

2. The composition of claim 1 wherein the compositions are macroparticles of greater than 20 Tyler mesh.

3. The composition of claim 1 wherein the compositions are prills or granules.

4. The composition of claim 3 wherein the composition is an ammonium salt-containing fertilizer.

5. The composition of claim 4 wherein the ammonium salt is ammonium nitrate or sulfate, or a mixture thereof.

6. The composition of claim 5 wherein the composition is coated with from about 1 to 5% by weight, based on total composition, of a moisture-absorptive material.

7. The composition of claim 4 wherein the composition is an ammonium nitrate-containing fertilizer.

8. The composition of claim 4 wherein the amount of hydroxy-aluminum polymer is from about 0.1 to 2% by weight and the hydroxyl to aluminum mol ratio is about 1.7 to 2.7.

9. The composition of claim 8 wherein the hydroxy-aluminum polymer is hydroxy-aluminum nitrate or sulfate.

10. The composition of claim 8 wherein the hydroxy-aluminum polymer is hydroxy-aluminum chloride.

11. A particulate ammonium nitrate composition containing 0.1 to 2% by weight, based on weight total composition, of a hydroxy-aluminum polymer having a hydroxyl to aluminum mol ratio of about 2.0 to 2.5.

12. A method of improving the caking resistance of particulate ammonium salt compositions which comprises intimately admixing therewith from about 0.01 to 5% by weight, based on weight total composition, a hydroxy-aluminum polymer having a hydroxyl to aluminum mol ratio of about 1 to 2.9.

13. The method of claim 12 wherein the composition is a fertilizer granule or prill having a greater than 20 Tyler mesh size.

14. The method of claim 13 wherein the composition is an ammonium salt-containing composition fertilizer.

15. The method of claim 14 wherein the ammonium salt is ammonium nitrate or sulfate.

16. The method of claim 15 wherein the amount of hydroxy-aluminum polymer is from about 0.1 to 2% by weight and the hydroxyl to aluminum ratio is about 1.7 to 2.7.

17. The method of claim 16 wherein the hydroxy-aluminum polymer is hydroxy-aluminum nitrate, sulfate or chloride.

18. The method of claim 12 wherein the hydroxy-aluminum polymer is admixed at a pH in the range of about 4 to 5 and the hydroxy to aluminum mol ratio is about 2.0 to 2.5.

* * * * *